(12) United States Patent
Iyer et al.

(10) Patent No.: US 10,292,029 B2
(45) Date of Patent: May 14, 2019

(54) MOD AUTOPAIRING IN MODULAR DEVICE SYSTEM

(71) Applicant: Motorola Mobility LLC, Chicago, IL (US)

(72) Inventors: Boby Iyer, Elmhurst, IL (US); Olivier Meirhaeghe, Lincolnshire, IL (US); Mary Hor-Lao, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/617,546

(22) Filed: Jun. 8, 2017

(65) Prior Publication Data
US 2018/0359598 A1    Dec. 13, 2018

(51) Int. Cl.
| | | |
|---|---|---|
| *H04W 4/00* | (2018.01) | |
| *H04W 4/80* | (2018.01) | |
| *H04W 8/00* | (2009.01) | |
| *H04W 76/11* | (2018.01) | |

(52) U.S. Cl.
CPC ............. *H04W 4/80* (2018.02); *H04W 8/005* (2013.01); *H04W 76/11* (2018.02)

(58) Field of Classification Search
CPC ... H04W 4/008; H04W 76/021; H04W 8/005; H04L 61/1588
USPC ...................... 455/41.1, 41.2, 41.3
See application file for complete search history.

(56) References Cited

U.S. PATENT DOCUMENTS

| | | | | |
|---|---|---|---|---|
| 2007/0249286 A1* | 10/2007 | Ma | ........................ | G06F 19/327 455/41.3 |
| 2015/0189461 A1* | 7/2015 | Pang | ..................... | H04W 4/008 455/41.1 |

* cited by examiner

*Primary Examiner* — Ping Hsieh
(74) *Attorney, Agent, or Firm* — Miller, Matthias & Hull LLP

(57) ABSTRACT

Systems and methods for autopairing a base portable electronic device and a dockable mod device in a modular device system includes detecting at the base device that the mod device has been docked to the base device, wherein such docking forms a wired connection between the base device and the mod device. Wireless communication parameters are received from the mod device at the base device over the wired connection, and the base device detects that the mod device has been undocked from the base device. The received wireless communication parameters are used thereafter at the base device to communicate wirelessly with the mod device.

16 Claims, 7 Drawing Sheets

MOD AUTOPAIRING IN MODULAR DEVICE SYSTEM

TECHNICAL FIELD

The present disclosure is related generally to modular portable device systems and, more particularly, to systems and methods for maintaining connectivity between a base device and an add-on device.

BACKGROUND

While portable devices such as smartphones have become increasingly capable, they have also become lighter and more compact. In order to increase the capabilities of such a device without adding permanent weight and size, the assignee of the present application has popularized a modular device system wherein different modules or "mods" can be docked to the base device when needed or desired and removed when not needed or desired. Examples of potential mods include sound mods, radio mods, television mods, camera mods and so on. As the foregoing suggests, these mods would be able to extend the base device's audio, radio, TV and camera capabilities respectively.

In some cases, it may be desired to maintain connectivity between the base device and an attached mod after the mod is undocked or detached from the base device. Moreover, since physical connectivity may be lost upon undocking, such continued connectivity may potentially be wireless. However, current wireless protocols such as Bluetooth and WiFi do not allow seamless continuation of prior physical connectivity via a new wireless connection.

Before proceeding to the remainder of this disclosure, it should be appreciated that the disclosure may address some of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
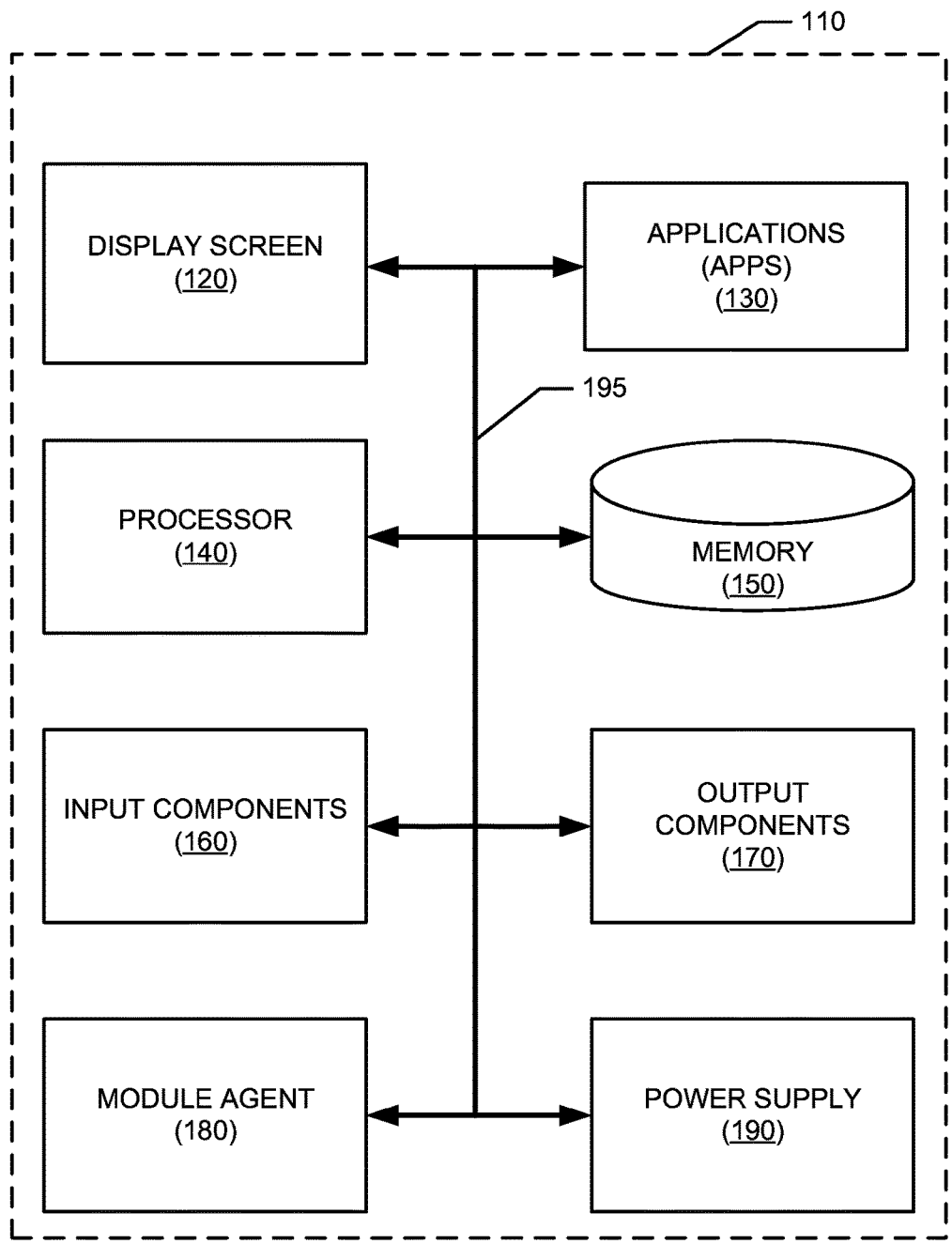
FIG. 1 is a modular view of an example electronic device usable in implementation of one or more embodiments of the disclosed principles.

Before presenting a detailed discussion of embodiments of the disclosed principles, an overview of certain embodiments is given to aid the reader in understanding the later discussion. As noted above, the inventors have determined that in a modular device system, it may be desirable to seamlessly maintain connectivity between a base device and a mod when the mod becomes undocked or detached from the base device.

Although physical connectivity will generally be lost upon undocking, continued connectivity may potentially be had via a wireless connection. However, for regulatory reasons pertaining to the device radiation certification, it is generally desirable to keep the mod radio off when the mod is attached to the base device. Moreover, as also noted, current wireless protocols such as Bluetooth and WiFi do not provide seamless continuation of a prior physical connectivity via a new wireless connection.

In an embodiment of the disclosed principles, network credentials for potential future wireless connectivity are exchanged during the pendency of the physical connection between the devices. The mod radio can then be activated and employed to create a wireless connection when the device or the mod detects detachment of the mod from the base device.

By way of example, in the case of a WiFi connection after detachment, such as for satellite TV stick or "dongle", a mod agent on the device reads credentials, and writes credentials such as the base device Media Access Control ("MAC") address, WiFi password and Service Set Identifier ("SSID") to the mod. This may occur when, or shortly after, the mod is docked to the base device for first time. Similarly, the mod may give its MAC address, so that when it is detached, the base device mod agent can turn on its WiFi facilities, scan for an available access point ("AP"), and create a connection between the mod and the base device.

A similar process also allows for continued connectivity via direct protocols such as Bluetooth. In the case of Bluetooth and similar protocols, much of the pairing (but not RF communication) may occur while the devices are attached instead of afterward as in the case of WiFi. In particular, the base device mod agent may read the mod's Bluetooth credentials from the mod while the devices are attached. When the mod is then detached at a later time, the mod and the base device turn on their Bluetooth signal transmission and receipt capabilities, and the base device, which already has the Bluetooth credentials of mod, then initiates the pairing.

With this overview in mind, and turning now to a more detailed discussion in conjunction with the attached figures, the techniques of the present disclosure are illustrated as being implemented in a suitable device environment. The following device description is based on embodiments and examples within which the disclosed principles may be implemented, and should not be taken as limiting the claims with regard to alternative embodiments that are not explicitly described herein. Thus, for example, while FIG. 1 illustrates an example computing device with respect to which embodiments of the disclosed principles may be implemented, it will be appreciated that other device types may be used, including but not limited to laptop computers, tablet computers, and so on.

The schematic diagram of FIG. 1 shows an exemplary mobile device 110 forming part of an environment within which aspects of the present disclosure may be implemented. In particular, the schematic diagram illustrates a user device 110 including example components. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, cellular, etc. The device 110 as illustrated also includes one or more output components 170 such as RF or wired output facilities. The RF output facilities may similarly support any number of protocols, e.g., WiFi, Bluetooth, cellular, etc. and may be the same as or overlapping with the associated input facilities. It will be appreciated that a single physical input may serve for both transmission and receipt.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 is a nontransitory media that may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules such as a mod agent 180, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation. The mod agent 180 is a software agent in an embodiment that manages the device 110's interactions with a mod device. The mod device will be shown in more detail in later figures.

In an embodiment, a power supply 190, such as a battery or fuel cell, is included for providing power to the device 110 and its components. Additionally or alternatively, the device 110 may be externally powered, e.g., by a vehicle battery or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules (e.g., the mod agent 180) and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display.

Figure 2:
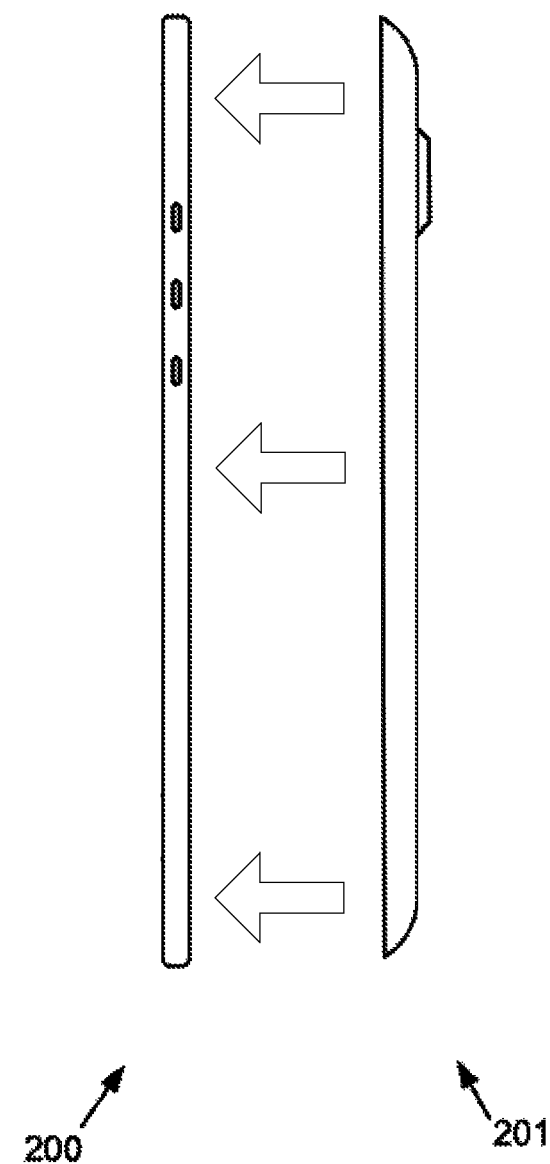
FIG. 2 is side view of a base device and mod device in accordance with an embodiment of the disclosed principles.

For further physical context regarding possible device and mod orientations and connection scenarios, FIG. 2 shows a side view of a base device 200, such as a smartphone, and a mod device 201, not yet mated (docked) together. As can be seen, in the illustrated example, the devices 200, 201 are the same height, but may be of different thicknesses. Although not clearly visible in FIG. 2, the devices 200, 201 may have essentially the same width dimension perpendicular to the page. Of course, any other device dimensions may be used as well, and the mod device 201 may be smaller or larger in any dimension relative to the base device 200.

Figure 3:
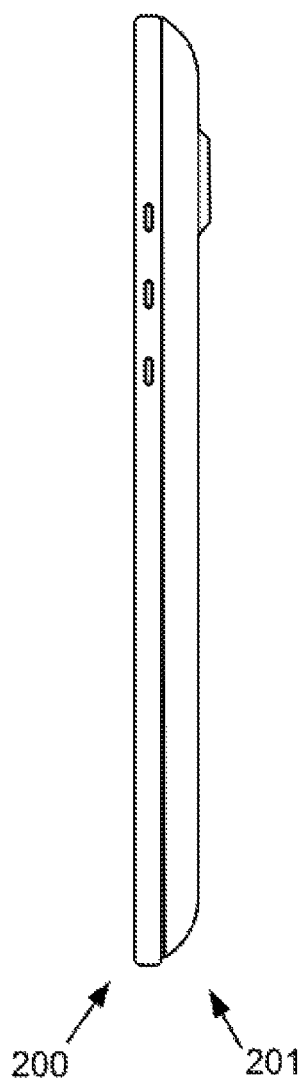
FIG. 3 is side view of the base device and mod device mated together in accordance with an embodiment of the disclosed principles.

Continuing, FIG. 3 is a side view of the base device 200 and the mod device 201 mated together in accordance with an embodiment of the disclosed principles. As can be seen, the devices 200, 201 are in physical contact when mated. It should be noted that different embodiments of either device 200, 201 may vary significantly in thickness and shape from one another.

Figure 4:
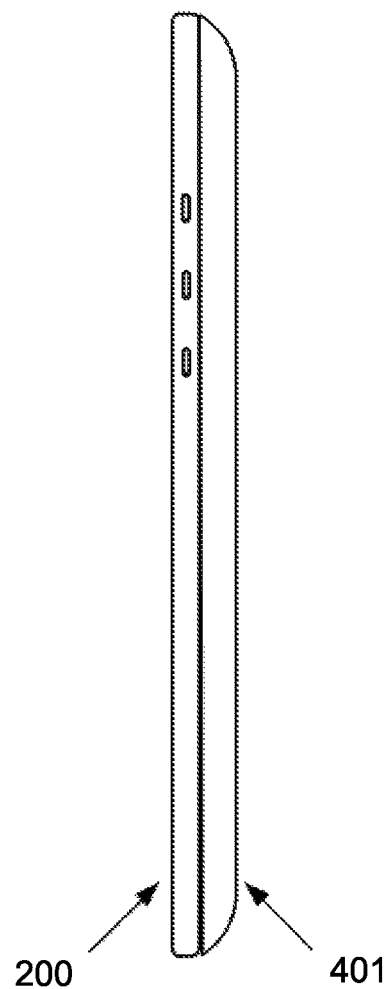
FIG. 4 is side view of the base device and an alternative mod device mated together in accordance with an embodiment of the disclosed principles.

It should be noted that the mod device 201 may be any one of multiple available device types. For example, while FIGS. 2-3 illustrate the mod device 201 as providing a camera function, FIG. 4 shows the base device 200 mated to an alternative mod device 401. The alternative mod device 401 is similar to the prior mod device 201 in form factor but lacks a camera. The alternative mod device 401 may also incorporate one or more other features not found on the prior mod device 201, such as additional battery capacity, additional wireless capabilities, audio playback capabilities, and so on.

Figure 5:
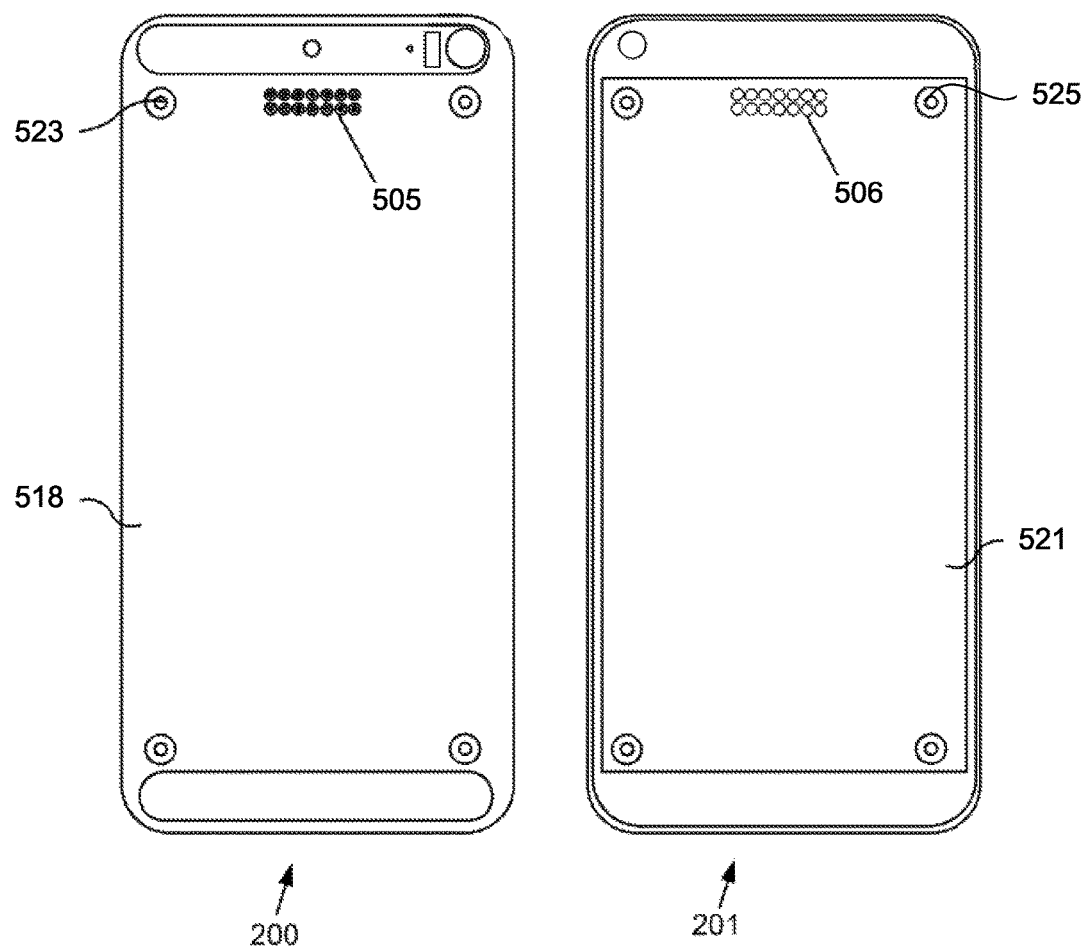
FIG. 5 is a simplified view of the base device and mod device, showing the back of the base device and the front of the mod device in accordance with an embodiment of the disclosed principles.

When the devices 200, 201/401 are mated (docked), they are not only in physical contact, but are also in electrical contact via a contact array on each, as shown in FIG. 5. This figure presents a view of the base device 200 and the mod device 201, showing the back 518 of the base device 200 and the front 521 of the mod device 201 in accordance with an embodiment of the disclosed principles. In the illustrated example, the back 518 of the base device 200 includes one or more alignment features 523 configured and placed to mate with mating features 525 on the front 521 of the mod device 201. In the illustrated embodiment, these features 521, 523 act both to align the devices and to hold the devices together, e.g., magnetically, although it will be appreciated that any other suitable mechanism or mechanisms for alignment and retention may be used.

In addition, the back 518 of the base device 200 in the illustrated embodiment includes a connector array 505. The connector array 505 is located and configured to mate with a mating connector array 506 on the front 521 of the mod device 201. Communications between the devices 200, 201 may be controlled by an appropriate module such as the module agent 180 on the base device 200 and a similar agent on the mod device 201. In an embodiment, these agents also manage the exchange of network information and any subsequent wireless connection initiation as set forth in greater detail hereinafter. One or both agents also detect detachment of the mod device 201 from the base device 200 based on the connectivity or lack thereof between the arrays 505, 506.

Figure 6:
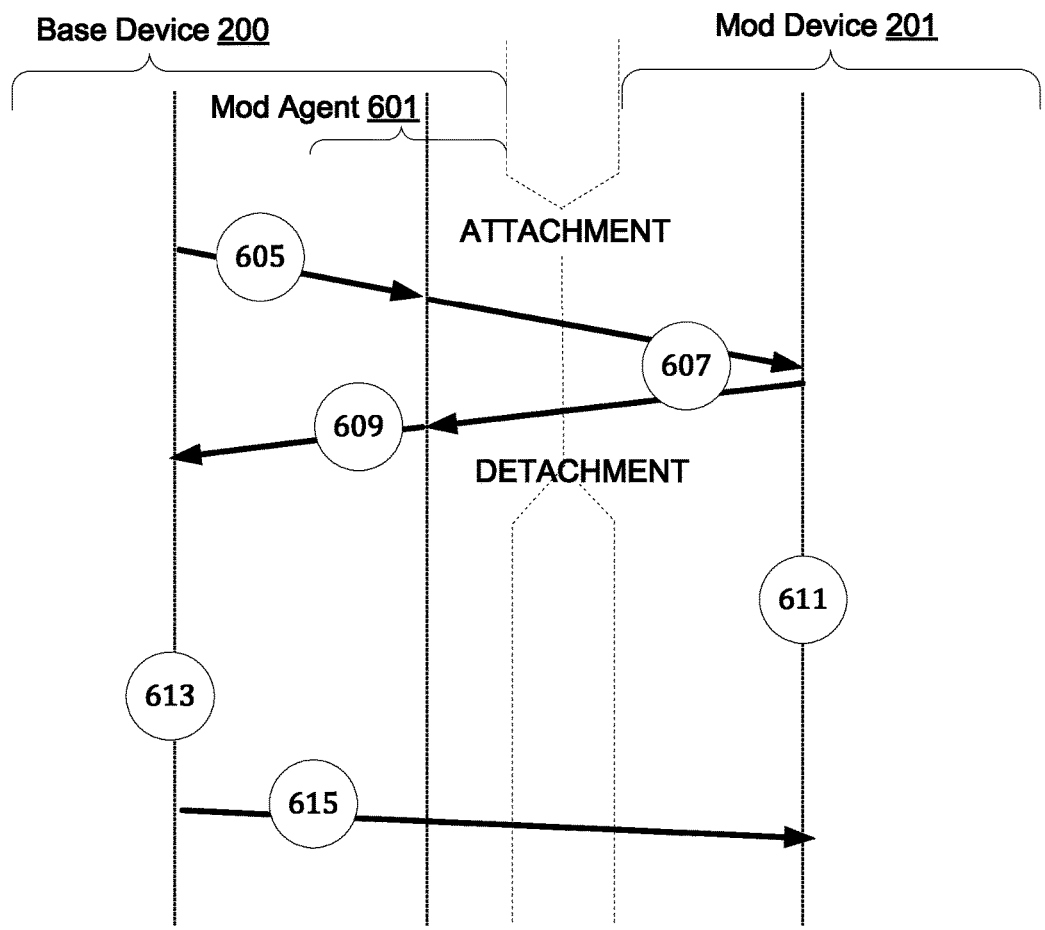
FIG. 6 is a process and event chart showing an example of communications and events taking place between a mod agent of the base device and the mod device when auto pairing for Bluetooth in accordance with an embodiment of the disclosed principles.

Turning to FIG. 6, this figure shows an example process flow between the mod agent 601 of the base device 200 and the mod device 201 when auto pairing for Bluetooth. As can be seen, after detecting docking of the mod device 201 to the base device and instantiating the mod agent 601 at communication 605, the base device 200 mod agent 601 reads the mod device Mac address from the mod device 201 at communications 607. The base device stores this data, e.g., via the mod agent 601 at 609.

When the mod device 201 is subsequently detached from the base device 200, the mod device 201 detects the detachment and turns on its Bluetooth radio at 611. This activation can be accomplished via the Boolean enable( ) command, for example, which powers all Bluetooth hardware on the mod device 201 and starts Bluetooth system services. As those of skill in the art will appreciate, this function returns a Boolean true to indicate adapter startup has begun, or a Boolean false to indicate error. It should be noted that this function may need explicit user approval on the base device 200, and so in an embodiment, a platform signature may be used in order to avoid a permission pop-up on the base device 200.

The base device 200 acquires the mod device Bluetooth instance using the MAC address initially obtained by the base device 200 at communication 613. This step may be accomplished via a getRemoteDevice command, using the acquired MAC address as the required string address input. Having acquired the mod device Bluetooth instance object, the base device 200 then requests pairing at communication 615, e.g., via a bonding command such as createBond. As with the mod device 201, a platform signature may be used to avoid pin entry on the base device 200 in an embodiment. Execution of the createBond command completes the pairing between the detached mode device 201 and the base device 200.

Figure 7:
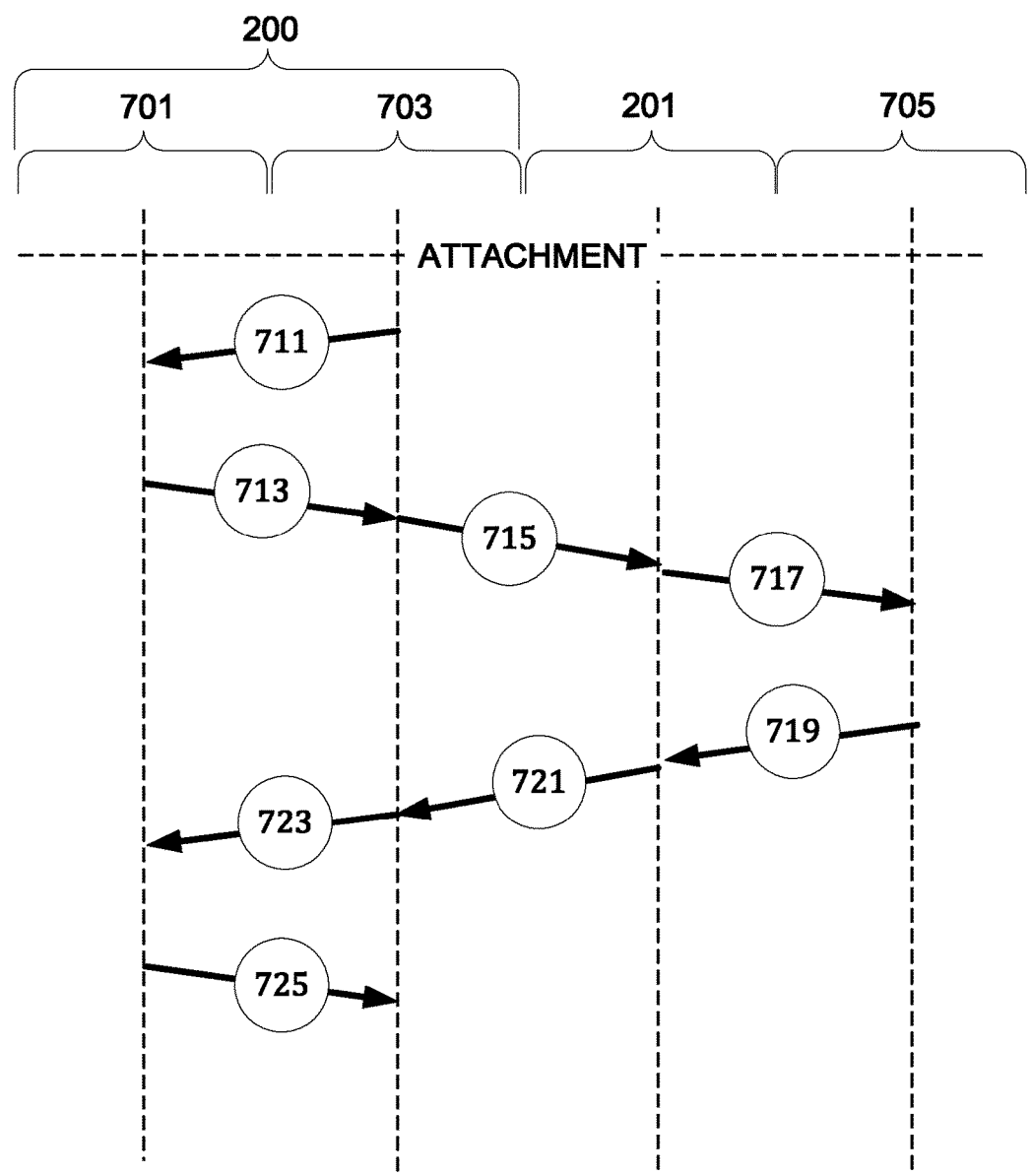
FIG. 7 is a process and event chart showing an example of communications and events taking place between the base device WiFi manager and mod agent, the mod device, which is a WiFi enabled "dongle" adapter, and the WiFi enabled dongle when auto pairing for WiFi in accordance with an embodiment of the disclosed principles.

As noted above, autopairing of a detached mod device 201 to a base device 200 may also be executed in the context of other protocols such as WiFi. In this connection, FIG. 7 shows an example process flow between the base device 200, and in particular its WiFi manager 701 and mod agent 703, and the mod device 201, which is a "dongle adapter" in this example, and a dongle 705 (e.g., satellite TV stick) when auto pairing for WiFi. In particular, the figure shows the exchange of networking data between the base device WiFi manager 701, base device mod manager 703, the mod device 201 and a satellite TV dongle 705 associated with (and attachable to/detachable from) the mod 201.

At event 711, the mod agent 703 alerts the WiFi manager 701 that the mod device 201, with dongle 705 attached, is physically docked to the base device 200. The WiFi manager 701 then instructs the mod agent 703 at event 713 to configure the network setting of the dongle 705. Thus at event 715, the mod agent 703 instructs the mod device 201, and at event 717, the mode device 201 in turn instructs the dongle 705.

The dongle 705 then at event 719 acknowledges the request of the mod device 201 and transmits its network details, e.g., its P2P MAC Address, to the mod device 201. The mod device 201 in turn transmits an acknowledgment and the received P2P MAC Address to the mod agent 703 at event 721. At event 723, the mod agent 703 sends a DTV ACK along with the received network data to the base device 200, which responds in event 725 with its own ACK. At this point, the dongle 705 and the base device 200 can assume wireless communication via WiFi when and if the dongle 705 is undocked, e.g., to be associated with a TV or other display device.

Although the examples herein employ either WiFi or Bluetooth as the wireless connection media, it will be appreciated that any other suitable wireless protocol may be used instead if desired or needed. For example, it may be preferred to use ZigBee rather than Bluetooth in certain contexts.

It will be appreciated that various systems and processes for device interaction control have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of autopairing a base portable electronic device and a stackable mod device in a modular device system comprising:
   detecting at the base device that the mod device has been physically stacked on the base device, wherein such physical stacking forms a wired connection between the base device and the mod device;
   receiving wireless communication parameters from the mod device at the base device over the wired connection;
   detecting at the base device that the mod device has been physically unstacked from the base device; and using the received wireless communication parameters at the base device to thereafter communicate wirelessly with the mod device by enabling wireless communications on the base device, retrieving an address of the mod device from the received wireless communication parameters and pairing with the mod device.

2. The method in accordance with claim 1, wherein the wireless communication parameters include a MAC (Media Access Control) address for the mod device.

3. The method in accordance with claim 1, wherein the wireless communication parameters are WiFi communication parameters.

4. The method in accordance with claim 3, wherein the mod device is a TV stick dock with TV stick docked in it.

5. The method in accordance with claim 4, wherein the wireless communication parameters are those of the TV stick.

6. The method in accordance with claim 3, wherein the wireless communication parameters include a MAC address, WiFi password and Service Set Identifier (SSID).

7. The method in accordance with claim 1, wherein the wireless communication parameters are Bluetooth communication parameters.

8. The method in accordance with claim 1, wherein the mod device is one of a visual capture device, a visual display device, an audio capture device and an audio play device.

9. A system of autopairing a base portable electronic device and a stackable mod device comprising:

a connection array on the base device configured to connect to a mating connection array on the mod device to form at least one wired connection when the mod device is physically stacked on the base device; and a processor associated with the base device, the processor being configured to detect via the connection array that the mod device has been physically stacked on the base device, receive wireless communication parameters from the mod device at the base device over the at least one wired connection, detect that the mod device has been physically unstacked from the based device, and use the received wireless communication parameters to thereafter communicate wirelessly between the base device and the mod device.

10. The system in accordance with claim 9, wherein the wireless communication parameters include a MAC (Media Access Control) address for the mod device.

11. The system in accordance with claim 9, wherein the wireless communication parameters are WiFi communication parameters.

12. The system in accordance with claim 11, wherein the mod device is a TV stick dock with TV stick docked in it.

13. The system in accordance with claim 12, wherein the wireless communication parameters are those of the TV stick.

14. The system in accordance with claim 11, wherein the wireless communication parameters include a MAC address, WiFi password and Service Set Identifier (SSID).

15. The system in accordance with claim 9, wherein the wireless communication parameters are Bluetooth communication parameters.

16. The system in accordance with claim 9, wherein the mod device is one of a visual capture device, a visual display device, an audio capture device and an audio play device.

* * * * *